July 27, 1948.  R. P. OWEN  2,445,964
CATHODE-RAY POWER INDICATOR
Filed Sept. 15, 1944
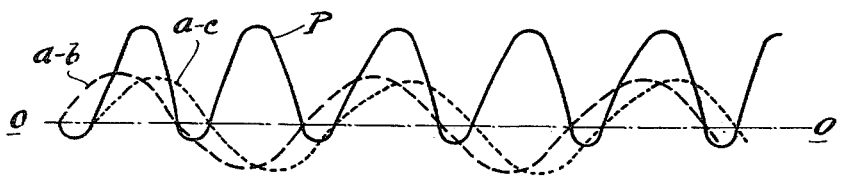
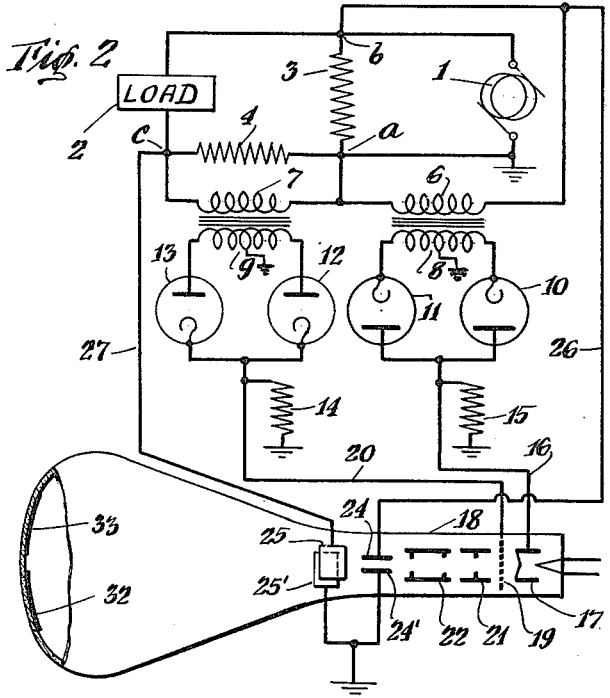
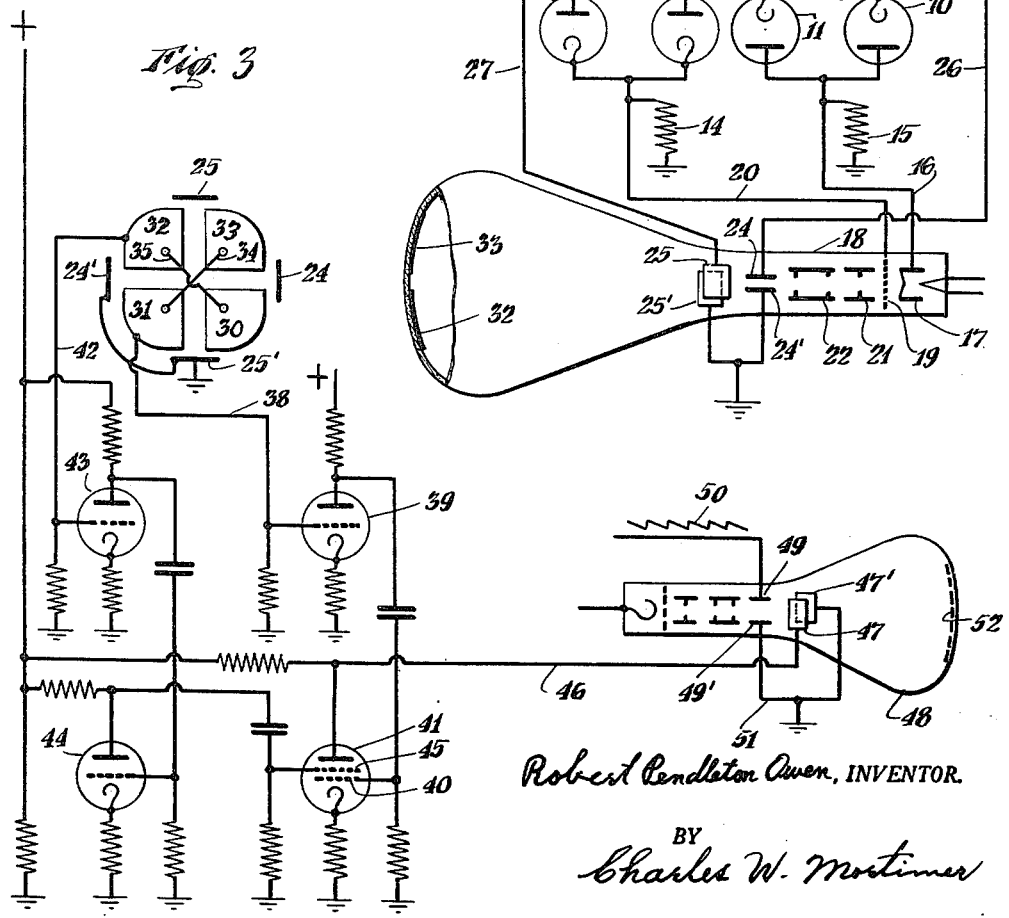
Robert Pendleton Owen, INVENTOR.
BY Charles W. Mortimer
ATTORNEY Patented July 27, 1948

2,445,964

UNITED STATES PATENT OFFICE 2,445,964

CATHODE-RAY POWER INDICATOR

Robert P. Owen, Passaic, N. J., assignor to Allen B. Du Mont Laboratories, Inc., Passaic, N. J., a corporation of Delaware Application September 15, 1944, Serial No. 554,320

4 Claims. (Cl. 171—95)

This invention relates to a device for indicating power consumed by a load to which an alternating voltage is applied whether the load is reactive or non-reactive.

In carrying out the invention, voltages across a power line and across a resistor in series with the load are utilized and applied to a cathode-ray tube. A signal from the collector plate of this tube is applied to another cathode-ray tube whereby a curve can be obtained to indicate the power.

The invention may be understood from the description in connection with the accompanying drawing, in which:

Fig. 1 shows curves of current, potential and power;

Fig. 2 is a diagram of connections showing how a signal is produced; and

Fig. 3 is a similar diagram showing how the signal is used for indicating the final result.

In the drawing, reference character 1 indicates a source of alternating current that is passed through the load 2. A resistor 3 is connected between the points $a$ and $b$ or across the terminals of the source 1, and a resistor 4 is connected in series with the load.

Primaries 6 and 7 of transformers are connected across the resistor 3 and resistor 4, respectively. The secondaries 8 and 9 of these transformers are grounded at their midpoints. The cathodes of diodes 10 and 11 are connected to opposite ends of the secondary 8 and plates of diodes 12 and 13 are connected to opposite ends of the secondary 9. A resistor 14 is connected between the cathodes of diodes 12 and 13 and ground, and a resistor 15 is connected between the plates of tubes 10 and 11 and ground.

A lead 16 connects the plates of diodes 10 and 11 to the cathode 17 of the cathode-ray tube 18. The control grid 19 of this cathode-ray tube is connected by lead 20 to the cathodes of diodes 12 and 13. The first anode of tube 18 is indicated at 21 and the second anode at 22. A pair of horizontal deflection plates is shown at 24, 24' and a pair of vertical deflection plates at 25, 25'.

A lead 26 connects the point $b$ on one side of load 2 to the plate 24 of the cathode-ray tube 18, the plate 24' being grounded. A lead 27 connects the point $c$ on the other side of load 2 to the plate 25 of this cathode-ray tube, the plate 25' being grounded. The screen of this tube 18 consists of four quadrants 30, 31, 32 and 33 separated and insulated from each other. Alternate or diagonal quadrants 30 and 32 are connected by lead 35, and the other quadrants 31, 33 are connected by the lead 34. With this tube 18 conditions of like and unlike polarity of two points in an electrical circuit can be ascertained regardless of the actual magnitude of their difference in potential.

A lead 38 extends from quadrants 31 and 33 to the grid of amplifier 39. The output of this amplifier is coupled to the grid 40 of a mixer tube 41. Lead 42 extends from the quadrants 30 and 32 to the grid of phase inverter 43. The output of this phase inverter is coupled to the grid of amplifier 44. The output from the amplifier 44 is coupled to the grid 45 of the mixer 41.

The output from the mixer 41 is coupled by lead 46 to one of the vertical deflection plates 47 of the cathode-ray tube 48. One of the horizontal deflection plates 49 of tube 48 is connected to a source of sawtooth voltage indicated at 50. The other horizontal deflection plate 49' and the other vertical deflection plate 47' of the tube 48 are grounded as indicated at 51.

The operation is as follows:

The load 2 is connected to an alternating current generator 1 through the series test resistor 4. This test resistor is of such small value that it does not affect the operation of the generator 1 or the load 2. Test resistor 3 connected across the terminals of the generator in Fig. 2 is convenient but is not necessary for the operation of the device. These resistors 3 and 4 are utilized for the measurement of voltage and current. Current from generator 1 flowing into the load 2 causes a voltage between points $a$ and $c$ at the ends of resistor 4 which is proportional at every instant to the current flowing at that instant. This voltage is applied to the primary 7 and the resulting current in secondary 9 is full-wave rectified by diodes 12 and 13, thus developing a voltage across load resistor 14 that is of the conventional full-wave rectified sinusoid shape. This voltage is applied to the control grid 19 of the cathode-ray tube 18.

In the same way the voltage across the points $a$ and $b$ is applied to the primary 6. The current from the secondary 8 of this transformer is rectified and the resulting output voltage across load resistor 15 is applied to the cathode 17 of tube 18.

These voltages are applied respectively to the grid 19 and the cathode 17 and determine the beam current of the cathode-ray tube 18. Diodes 10 and 11 are connected in a manner reversed from that of diodes 12 and 13 because the effect of a change in potential of the cathode on the beam of the cathode-ray tube is opposite to the effect of a similar change in potential of the grid.

As connected in Fig. 2, an increase in load 2 current or generator 1 voltage, or both, causes an increase in the beam current of control tube 18. This change in the beam current of tube 18 resulting from a change in grid 19 or cathode 17 potential, or both, is used to indicate power.

In order to differentiate between instantaneously positive and negative power, the screen of control cathode-ray tube 18 is a metal target divided into four quadrants (Fig. 3). Alternate quadrants 30 and 32 are connected by conductor 35 and alternate quadrants 31 and 33 are likewise connected by conductor 34. The space between these quadrants is sufficient to keep them insulated from each other. The electron beam of tube 18 normally lies along the center line of this tube. The voltage of generator 1 is applied to one deflection plate 24 of the tube 18 and the voltage across the resistor 4, which is proportional to the current flowing through the load, is applied to another deflection plate 25 of this control tube. So-called "single-ended" deflection is shown with one plate of each pair grounded.

When the voltage and current in the load are both positive, that is, when the potential at point b and at point c is positive, the electron beam 18 is deflected in the direction of deflection plate 24 and also in the direction of deflection plate 25, which causes the resulting deflection of the beam to be upward and to the right. The beam current is then received by quadrant 33 and a negative signal is thereby impressed by lead 36 on the grid of the tube 39.

When the current and voltage in the load are both negative, that is, when the potential at point b and point c is negative, the beam 18 is deflected in the direction of deflection plate 24' and also in the direction of deflection plate 25' and the beam current is then received by quadrant 31, which causes a negative signal to be applied again to the control grid of tube 39. These negative signals are proportional to the beam current, which is determined by the amplitude of the load current and voltage in the manner previously explained. When these negative signals are impressed on the grid of tube 39 positive signals result at its plate, and are impressed upon grid 40 of mixer tube 45.

Grids 40 and 45 have identical control characteristics as far as the plate current of tube 41 is concerned, and the gain of tubes 43 and 44 in cascade is equal to the gain of the single stage 39.

When the load current and voltage are of unlike sign, that is, when point b (Fig. 2) is positive and point c is negative, or vice versa, the beam of tube 18 is deflected onto quadrant 30 or 32, and a negative signal proportional to the product of the load current and voltage is applied to the grid of tube 43.

When the control grid of tube 43 receives this negative signal, a positive signal is developed at its plate which is connected to the grid of tube 44. This tube 44 acts merely as a phase inverter, changing the signal received from tube 43 from positive to negative and applying it to grid 45 of mixer tube 41. Since the output signal from the plate of mixer tube 41 is applied to the vertical deflection plate 17 of the indicator cathode-ray tube 46 the beam of this latter tube is deflected upwardly when the beam of control tube 18 falls on quadrants 31 or 33 and is deflected downwardly when the beam falls on quadrants 30 or 32 thus indicating respectively positive or negative power in the load 2. The amplitude of deflection is determined by the beam current of control tube 18, which in turn is dependent upon the instantaneous amplitudes of the load current and voltage.

By having a conventional linear saw-tooth sweep voltage 50, with a frequency that is some multiple of the frequency of generator 1 that is applied to a horizontal deflection plate of indicator tube 46, a curve P of instantaneous power as shown in Fig. 1 is traced on the screen of the indicator cathode-ray tube 46.

The amplifications of the various tubes 39, 41, 43 and 44, are such that a signal passing through tubes 39 and 41 is amplified to the same extent as a signal passing through tubes 43, 44 and 41.

What is claimed is:

1. A device for indicating the power consumed in an electrical load, which comprises a resistor in series with said load, a resistor in parallel with said load, transformers having their primaries connected respectively across said resistors, a relay cathode-ray tube having sections of conducting material on the inside face thereof, and means connected to opposite ends of said load to cause the ray of said tube to be deflected onto said sections in accordance with the power factor of said load, the grid and cathode of said cathode-ray tube being connected, respectively, to the secondaries of said transformers.

2. The device of claim 1, in which means are provided to cause an increase in the intensity of the beam of said tube when the current through the load is increased.

3. The device of claim 1, in which means are provided to cause an increase in the intensity of the beam of said tube when the voltage across the load is increased.

4. A device for indicating the power consumed in an electrical load, which comprises a resistor in series with said load, a resistor in parallel with said load, a transformer primary connected across each of said resistors, respectively, a relay cathode-ray tube having sections of conducting material on the inside face thereof divided into separated insulated sections, means connected from opposite ends of said load to the horizontal and vertical deflection plates of said tube to cause the ray of said tube to be deflected onto said sections in accordance with the power factor of said load, and means comprising another cathode-ray tube which has one of its deflection plates connected to said sections to indicate said load.

ROBERT P. OWEN.

REFERENCES CITED

The following references are of record in the file of this patent:

UNITED STATES PATENTS

| Number | Name | Date |
|---|---|---|
| 2,027,393 | McCreary | Jan. 14, 1936 |
| 2,130,134 | Iams | Sept. 13, 1938 |
| 2,324,851 | Koch | July 20, 1943 |
| 2,328,985 | Luck | Sept. 7, 1943 |